UNITED STATES PATENT OFFICE.

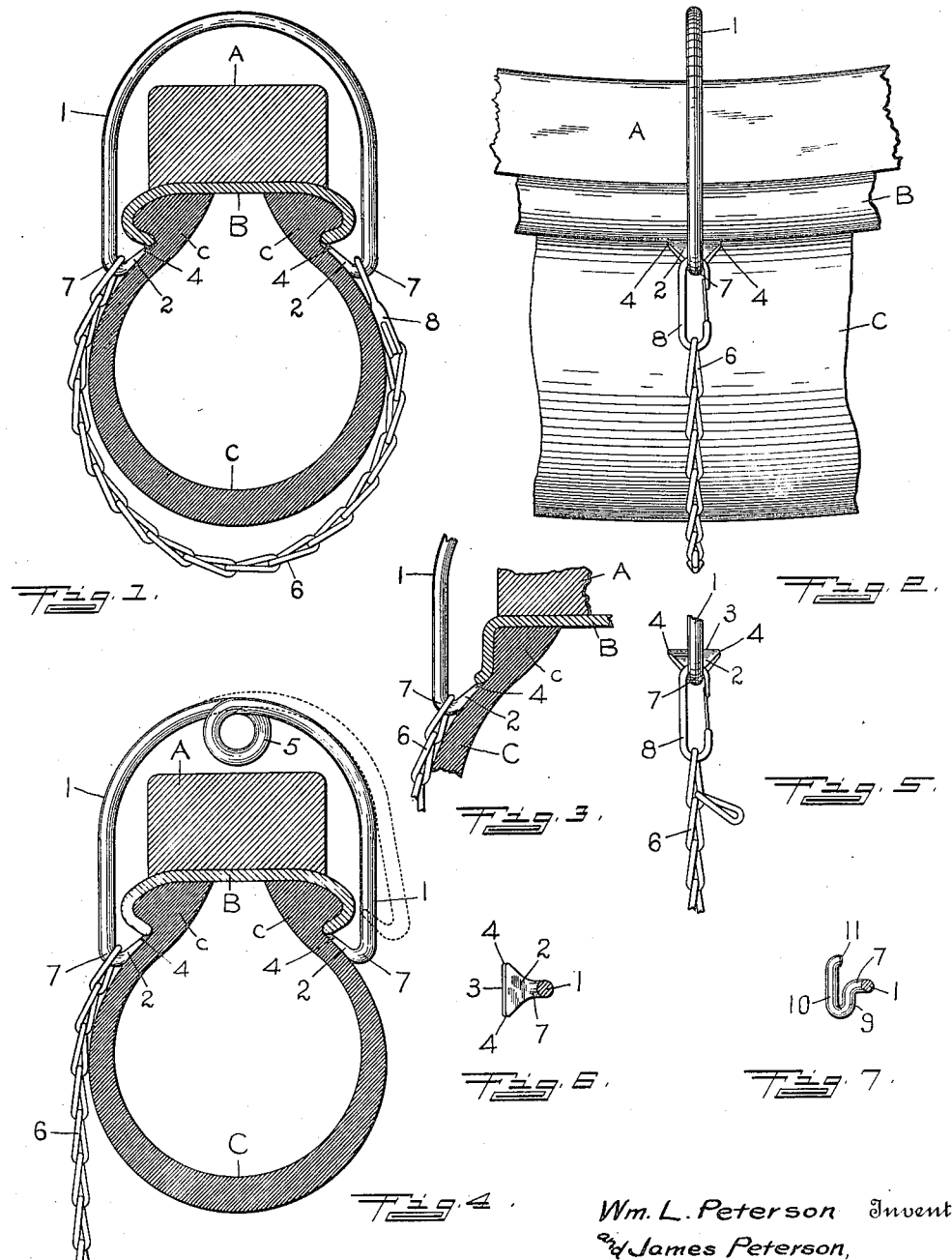

WILLIAM L. PETERSON AND JAMES PETERSON, OF AUBURN, NEBRASKA.

EMERGENCY TIRE-CHAIN.

1,282,284.　　　　　Specification of Letters Patent.　　Patented Oct. 22, 1918.

Application filed March 14, 1916. Serial No. 84,071.

*To all whom it may concern:*

Be it known that we, WILLIAM L. PETERSON and JAMES PETERSON, both citizens of the United States, residing at Auburn, in the county of Nemaha and State of Nebraska, have invented certain new and useful Improvements in Emergency Tire-Chains, of which the following is a specification.

Our invention relates to removable anti-slipping devices for the wheels of motor vehicles, and particularly to detachable tread-chains for use with pneumatic tires. It is the object of our invention to provide a simple, efficient and inexpensive device for the above purpose, constructed so that it may be easily applied to the wheels and removed therefrom, and so that when in use it will engage only the tire and will not touch or mar the wheel-rim or felly. A further object is to provide an attaching means for the chain, such that the same device may be used upon nearly any common size or style of pneumatic tire, and so that the chain may be securely held without causing injury to the tire.

In the accompanying drawings Figure 1 is a transverse section of a tire and wheel-rim having applied thereto a device embodying our invention, Fig. 2 is a side view of the same, Fig. 3 is a detail transverse sectional view showing the relation of the clamp-head to a straight-sided or Dunlop style of tire, Fig. 4 is a view similar to Fig. 1, showing a modified form of the clamp-body, Fig. 5 is a detail side view of a part of the device, showing the snap-link, Fig. 6 is a detail of one of the clamp-heads, and Fig. 7 is a similar view of a modified form of the same.

In carrying out our invention we provide a clamp device comprising an approximately U-shaped body 1 having at the ends thereof integral flattened heads 2 which extend angularly inward, said heads being approximately triangular in form and lying in planes at right angles to the plane of the U-bend of the body 1. The edges 3 at the ends of the heads are substantially parallel with each other, and are rounded off at the ends 4 so as to present no sharp angular edges or corners. The clamp-body is made of suitable resilient material such as spring-steel, and the body-portion 1 may be provided at its center with a coil or loop 5, as shown in Fig. 4, to increase the flexibility thereof.

The clamp-body is placed upon a wheel by passing the same in around the felly A and rim B of the wheel, placing one of the heads 2 against the side of the inflated pneumatic tire C just above the bead c and with the edge 3 of the head adjoining the edge of the rim-flange, then springing the body 1 sufficiently to enable the other head 2 to pass around the other side of the rim B as indicated by the dotted lines in Fig. 4, so that the latter head will finally spring inward and rest against the tire in the same manner as the first. The heads 2 are so inclined to the end-portions of the body 1 that they will lie flat against the sides of the tire, and the clamp is so proportioned that the heads will press yieldingly inward upon the tire, sufficiently to retain the clamp in position thereon, but not enough to displace the beads c from the rim-flanges or to injure the tire. It may be here noted that the transverse dimension of nearly all tires now in common use is approximately the same at the points engaged by the clamp-heads, and the resilience of the clamp-body is sufficient to compensate for the slight variations of dimension between said parts engaged by the clamp-heads, so that the clamp is applicable to all such tires regardless of variations of size in other parts thereof.

In connection with the described clamp, we employ a suitable chain 6 of such length as to pass loosely around the tread portion of the largest tire on which the device is to be used, extending from the bent neck-portion 7 of the clamp-body at one side to the like neck-portion at the other side of the tire. The chain is preferably provided at one end with a snap-link 8 so that it may be readily attached to and detached from the neck 7, and, when used upon small tires, the effective length of the chain may be reduced by connecting the snap-link with a link other than the end-link of the chain, as shown in Fig. 5.

In Fig. 7 there is shown a slightly modified form for the heads of the clamp-body. In this design the heads are not formed by flattening or spreading out of the material into a triangular shape, as are the heads 2 first described, but each head is made by first bending the material from the neck 7 laterally as at 9, then returning a portion 10 parallel with the part 9, and finally turning the end 11 slightly outward. The inner side of the portion 10 thus corresponds with the edge 3 of the heads 2.

In practice, any desired number of the devices may be applied to a wheel, but it is sufficient usually to employ three or four of the chains on each of the driving wheels of the vehicle. By having the chains somewhat loose as shown in Fig. 1, the places at which they will engage the tread of the tire will vary from time to time sufficiently to prevent undue wear of the tire at any particular point, without there being, however, any change in the positions of the clamp-bodies. It has been found that clamps constructed in accordance with our invention will remain fixedly in any position at which they may be placed upon the tire, not being moved circumferentially of the wheel by the traction of the chains, and not causing any appreciable or injurious wear upon the engaged parts of the tire. As the clamps do not touch any part of the wheel-felly or rim, except the extreme edge of the rim-flange, adjoining the tire, no wear or marring of the finish of said parts is caused by the use of the chains.

The ease with which the chain devices may be applied to and removed from the wheels, and their compactness when not in use, renders them highly desirable for emergency use by drivers of motor vehicles.

Now, having described our invention, what we claim and desire to secure by Letters Patent is:

In a tire chain device, a resilient U-shaped clamp-body having angularly inturned hook-like end portions with flat triangular heads thereon, and a chain having its ends linked onto said hook-like portions of the clamp-body, the clamp-body being adapted to pass around the inner side of a wheel-felly and tire-rim, with the adjacent sides of the flat heads yieldingly engaging the sides of a pneumatic tire disposed upon said tire-rim, the terminal edges of said heads engaging the peripheral edge of said rim and forming the sole contact between the clamp and any part of the wheel, and the chain extending loosely over the tread portion of the tire.

WM. L. PETERSON,
JAMES PETERSON.